(12) United States Patent
Ji

(10) Patent No.: US 12,565,229 B2
(45) Date of Patent: Mar. 3, 2026

(54) SYSTEM FOR CONTROLLING VEHICLE BASED ON STATE OF CONTROLLER AND SYSTEM FOR CONTROLLING VEHICLE BASED ON COMMUNICATION STATE

(71) Applicant: HYUNDAI MOBIS CO., LTD., Seoul (KR)

(72) Inventor: Yong Kwan Ji, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 356 days.

(21) Appl. No.: 18/089,944

(22) Filed: Dec. 28, 2022

(65) Prior Publication Data

US 2023/0234606 A1      Jul. 27, 2023

(30) Foreign Application Priority Data

Jan. 21, 2022    (KR) ........................ 10-2022-0008946
Jan. 28, 2022    (KR) ........................ 10-2022-0013212

(51) Int. Cl.
*B60W 60/00*        (2020.01)
*B60W 40/12*        (2012.01)
*B60W 50/029*       (2012.01)
*B60W 50/04*        (2006.01)
*B60W 50/08*        (2020.01)

(52) U.S. Cl.
CPC .......... *B60W 60/001* (2020.02); *B60W 40/12* (2013.01); *B60W 50/04* (2013.01); *B60W 50/082* (2013.01); *B60W 2050/0297* (2013.01); *B60W 60/0053* (2020.02); *B60W 60/0054* (2020.02); *B60W 60/0057* (2020.02);
(Continued)

(58) Field of Classification Search
CPC .... B60W 60/001; B60W 40/12; B60W 50/04;
B60W 50/082; B60W 60/0053; B60W
60/0054; B60W 60/0057; B60W 60/0061;
B60W 2050/0297; B60W 2556/45; B60W
2556/65; B60W 60/0051; B60W
2540/215; B60W 50/035; B60W 60/0055;
B60W 2050/021; B60W 50/14; B60W
50/0205
USPC ......................................................... 701/23
See application file for complete search history.

(56) References Cited

U.S. PATENT DOCUMENTS

2018/0268695 A1*  9/2018  Agnew ................. B60W 50/14
2019/0286131 A1*  9/2019  Sasaki ...................... G08G 1/16
(Continued)

FOREIGN PATENT DOCUMENTS

KR        2021084759 A  *  7/2021  ............. B60W 10/20
KR        2022001922 A  *  1/2022  ............. B60W 10/04
(Continued)

*Primary Examiner* — Tiffany P Young
*Assistant Examiner* — Leah N Miller
(74) *Attorney, Agent, or Firm* — NSIP Law

(57)        ABSTRACT

Disclosed is a system for vehicle control. The system analyzes a state of each controller of multiple controllers inside a vehicle based on information collected from the controllers, learns the state of the each controller, based on a state analysis result obtained by analyzing the state of the each controller, and determines an abnormal state for at least one of the controllers, based on the state analysis result for the each controller and a learning result obtained by learning the state of the each controller. The system also includes a vehicle controller that manages vehicle control rights, based on the abnormal state for the at least one of the one or more controllers.

19 Claims, 15 Drawing Sheets

(52) U.S. Cl.
CPC ..... *B60W 60/0061* (2020.02); *B60W 2556/45*
*(2020.02); B60W 2556/65* (2020.02)

(56) References Cited

U.S. PATENT DOCUMENTS

| | | | | |
|---|---|---|---|---|
| 2020/0070827 A1* | 3/2020 | Choi | ................. | B60W 60/0053 |
| 2020/0283007 A1* | 9/2020 | Choi | ................. | B60W 50/029 |
| 2020/0307646 A1* | 10/2020 | Kato | ..................... | B60W 50/00 |
| 2021/0354720 A1* | 11/2021 | Ha | ................... | B60W 60/0054 |
| 2022/0250655 A1* | 8/2022 | Yamashita | .............. | G05D 1/02 |

FOREIGN PATENT DOCUMENTS

| | | | | | |
|---|---|---|---|---|---|
| WO | WO-2019122968 A1 * | 6/2019 | ........... | B60W 40/08 |
| WO | WO-2021024588 A1 * | 2/2021 | ........... | B60W 50/04 |
| WO | WO-2021201308 A1 * | 10/2021 | | |

* cited by examiner

| ABNORMAL STATE OF CONTROLLER | |
|---|---|
| FIRST PHASE | NO CONTROLLER IS ABNORMAL |
| | AGING STATE AND RESPONSE PERFORMANCE OF CONTROLLER IS NORMAL |
| SECOND PHASE | STEERING-RELATED FUNCTION IS ABNORMAL |
| | ACCELERATION/DECELERATION-RELATED FUNCTION IS ABNORMAL |
| | AGING STATE AND RESPONSE PERFORMANCE OF CONTROLLER RELATED TO STEERING OR ACCELERATION/DECELERATION IS ABNORMAL |
| | SENSOR IS FAILED EXCEPT FOR FRONT SENSOR (CAMERA, RADAR, LIDAR) |
| | RESPONSE PERFORMANCE OF ALL CONTROLLER IS ABNORMAL |
| THIRD PHASE | CONTROLLER FAILED |
| | ALL SENSORS RELATED TO AUTONOMOUS DRIVING ARE FAILED |
| | FRONT SENSORS (CAMERA, RADAR, LIDAR) ARE FAILED |
| | CONTROLLER RELATED TO STEERING AND ACCELERATION/DECELERATION IS FAILED |
| | NO CONTROLLER RESPONDS |

FIG.2

| CONTROLLER ABNORMAL STATE | CONTROL RIGHT |
|---|---|
| FIRST PHASE | AUTONOMOUS DRIVING CONTROLLER<br>(WHOLE CONTROL RIGHT) |
| SECOND PHASE | AUTONOMOUS DRIVING CONTROLLER<br>(PARTIAL CONTROL RIGHT)<br>OR<br>DRIVER SELECTION |
| THIRD PHASE | DRIVER<br>(WHOLE CONTROL RIGHT)<br>OR<br>AUTONOMOUS DRIVING CONTROLLER<br>(DRIVER MANIPULATION NOT SENSED) |

FIG.3

| CONTROLLER ABNORMAL STATE | AUTONOMOUS DRIVING CONTROLLER | DRIVER |
|---|---|---|
| STEERING-RELATED FUNCTION IS ABNORMAL | ACCELERATION/ DECELERATION CONTROL | |
| RESPONSE PERFORMANCE OF STEERING-RELATED CONTROLLER IS ABNORMAL | ACCELERATION/ DECELERATION CONTROL | |
| STEERING-RELATED CONTROLLER IS AGED | ACCELERATION/ DECELERATION CONTROL | (DRIVER SELECTION) |
| ACCELERATION/DECELERATION-RELATED FUNCTION IS ABNORMAL | | STEERING CONTROL |
| RESPONSE PERFORMANCE OF ACCELERATION/ DECELERATION-RELATED CONTROLLER IS ABNORMAL | | STEERING CONTROL |
| ACCELERATION/DECELERATION-RELATED CONTROLLER IS AGED | (DRIVER SELECTION) | STEERING CONTROL |
| FAILURE IN SENSOR OTHER THAN FRONT SENSOR | (DRIVER SELECTION) | (DRIVER SELECTION) |

FIG.4

| | ABNORMAL COMMUNICATION STATE |
|---|---|
| FIRST PHASE | AGING STATE OF CONTROLLER DETERMINED & NO INFLUENCE ON VEHICLE CONTROL BY RESPONSE PERFORMANCE OF RELEVANT CONTROLLER |
| SECOND PHASE | FAILURE IN CONSISTENCY OR SUITABILITY OF V2I COMMUNICATION DATA |
| | FAILURE IN CONSISTENCY OR SUITABILITY OF V2V COMMUNICATION DATA |
| | EMPORARY SLOWDOWN OR INTERMITTENT DISCONNECTION IN VEHICLE NETWORK COMMUNICATION SPEED & COMMUNICATION ABNORMALITIES ARE COMPLEMENTED BY USING COMMUNICATION DATA RECEIVED THROUGH V2X COMMUNICATION |
| | TEMPORARY SLOWDOWN OR INTERMITTENT DISCONNECTION IN V2X COMMUNICATION & COMMUNICATION ABNORMALITIES ARE COMPLEMENTED USING SENSOR DATA RECEIVED THROUGH VEHICLE NETWORK COMMUNICATION |
| | AGING STATES OF FIRST COMMUNICATION MODULE AND/ OR SECOND COMMUNICATION MODULE DETERMINED |
| THIRD PHASE | VEHICLE NETWORK COMMUNICATION FAILED |
| | COMMUNICATION SPEED OF VEHICLE NETWORK MAKE IT DIFFICULT TO PROCESS DATA IN REAL TIME |
| | V2X COMMUNICATION FAILED |
| | V2X COMMUNICATION SPEED MAKES IT DIFFICULT TO PROCESS DATA IN REAL TIME |

FIG.10

| ABNORMAL COMMUNICATION STATE | AUTONOMOUS DRIVING CONTROLLER | DRIVER |
|---|---|---|
| COMMUNICATION MODULE AGED | SELECTION BY DRIVER | SELECTION BY DRIVER |
| TRAVELING ON ROAD HAVING SPEED LIMIT OF V KPH OR LESS & V2X COMMUNICATION NORMAL & VEHICLE NETWORK COMMUNICATION ABNORMAL | ACCELERATION/ DECELERATION CONTROL | |
| STEERING-RELATED FUNCTION ABNORMAL | ACCELERATION/ DECELERATION CONTROL | |
| RESPONSE PERFORMANCE OF STEERING-RELATED CONTROLLER ABNORMAL | ACCELERATION/ DECELERATION CONTROL | |
| ALARM OF STEERING-RELATED CONTROLLER AGED | ACCELERATION/ DECELERATION CONTROL | SELECTION BY DRIVER |
| ACCELERATION/DECELERATION-RELATED FUNCTION ABNORMAL | | STEERING CONTROL |
| RESPONSE PERFORMANCE OF ACCELERATION/ DECELERATION-RELATED CONTROLLER ABNORMAL | | STEERING CONTROL |
| ALARM OF ACCELERATION/ DECELERATION-RELATED CONTROLLER AGED | SELECTION BY DRIVER | STEERING CONTROL |
| FAILURE SENSOR OTHER THAN FRONT SENSOR | SELECTION BY DRIVER | SELECTION BY DRIVER |

FIG.11

SYSTEM FOR CONTROLLING VEHICLE BASED ON STATE OF CONTROLLER AND SYSTEM FOR CONTROLLING VEHICLE BASED ON COMMUNICATION STATE

CROSS-REFERENCE TO RELATED APPLICATION

This application claims the benefit under 35 USC § 119(a) of Korean Patent Application Nos. 10-2022-0008946 and 10-2022-0013212, filed in the Korean Intellectual Property Office on Jan. 21, 2022, and Jan. 28, 2022, respectively, the entire disclosures of which are hereby incorporated by reference for all purposes.

BACKGROUND

The present disclosure relates to a system for controlling a vehicle based on a state of a controller and a system for controlling a vehicle based on a communication state.

DESCRIPTION OF RELATED ART

In general, an autonomous driving system of a vehicle determines the driving condition of a vehicle, based on communication with controllers inside the vehicle, and communication with a roadside device or a surrounding vehicle around the vehicle, and automatically controls the vehicle driving based on the driving condition.

For example, a Departed Driver Rescue and Exit Maneuver (DDREM) system is a technology which allows the vehicle to stop safely when the driver suddenly falls into an inoperable state, such as drowsy driving or heart attack, and prevents accidents by automatically controlling the driving of the vehicle according to the driver condition.

The autonomous driving system transmits and receives a signal through Vehicle to X (V2X) communication with the roadside device or the surrounding vehicle and vehicle network communication with in-vehicle controllers (sensors) to control the driving condition of the vehicle. Accordingly, the communication state is an important factor in the autonomous driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a system for vehicle control. The system analyzes a state of each controller of multiple controllers inside a vehicle based on information collected from the controllers, learns the state of the each controller, based on a state analysis result obtained by analyzing the state of the each controller, and determines an abnormal state for at least one of the controllers, based on the state analysis result for the each controller and a learning result obtained by learning the state of the each controller. The system also includes a vehicle controller that manages vehicle control rights, based on the abnormal state for the at least one of the one or more controllers.

The processors may analyze at least one of an aging state, a fault state, response performance, a control amount, and a sensor state of each controller, based on the information collected from the controllers.

The processors may learn response performance of each controller, based on the state analysis result of the controller, select a control parameter for determining performance of the controller, based on the state analysis result of the controller, and learn a parameter value input from the controller, based on the selected control parameter.

When determining the abnormal state for the controllers, the processors may determine an abnormal state phase resulting from the abnormal state of the at least one of the controllers.

The vehicle controller may provide, to one of an autonomous driving controller and a manual driving control configured for operation by a driver, control rights over functions for supporting autonomous driving of the vehicle, based on the abnormal state phase resulting from the abnormal state of the at least one of the controllers.

The vehicle controller may provide, to the autonomous driving controller, all control rights over the functions for supporting the autonomous driving of the vehicle, when the determined abnormal state phase of the at least one of the one or more controllers is a first phase.

When the determined abnormal state phase of the at least one of the one or more controllers is a second phase, the vehicle controller may provide to the autonomous driving controller, control rights over some of the functions for supporting the autonomous driving of the vehicle, and query the driver, via the manual driving control, regarding control rights over a remaining portion of the functions for supporting the autonomous driving of the vehicle, and provide the control rights over the remaining portion of the functions to the autonomous driving controller or the manual driving control, depending on selection of the driver in response to the query.

The vehicle controller may provide, to the manual driving control, all of the control rights over the functions for supporting the autonomous driving of the vehicle, when the determined abnormal state phase of the controller is a third phase.

The vehicle controller may switch all of the control rights provided to the manual driving control to the autonomous driving controller, when manipulation of the manual driving control by the driver is not sensed for a specific time period.

In another general aspect, here is provided a system for vehicle control, based on a communication state. The system includes a first communication module configured communicate with controllers inside a vehicle, a second communication module configured to communicate with at least one of a roadside device and a surrounding vehicle around the vehicle, and a vehicle controller configured to analyze and learn a state of communication by the first communication module and the second communication module, determine an abnormal communication state of the vehicle, and determine a target to own a vehicle control right depending on the abnormal communication state of the vehicle.

The vehicle controller may include processors that analyze the state of the communication by the first communication module and the second communication module, learn the state of the communication by the first communication module and the second communication module, based on a result obtained by analyzing the state of the communication, and determine an abnormal communication state of the vehicle, based on the result, which is obtained by analyzing the state of the communication by the first communication module and the second communication module, and a result obtained by learning the state of the communication by the first communication module and the second communication module.

The processors may analyze consistency of a communication speed, a communication connection state, and communication data, based on the communication data between the first communication module and the controllers, analyze consistency and suitability of the communication speed, the communication connection state, and the communication data, based on vehicle to infrastructure (V2I) communication data between the second communication module and the roadside device, and analyze consistency and suitability of the communication speed, the communication connection state, and the communication data, based on vehicle to vehicle (V2V) communication data between the second communication module and the surrounding vehicle.

The processors may learn the communication speed and the communication state for each region, each terrain, and each attribute of communication data, with respect to the first communication module, the second communication module, and the controllers.

The processors may determine an abnormal communication state of at least one of the first communication module and the controllers, based on consistency of a communication speed, a communication connection state, and communication data between the first communication module and the controller, and determine an abnormal communication state of the second communication module, based on consistency and suitability of a communication speed, a communication connection state, and communication data among the second communication module, the roadside device, and the surrounding vehicle.

The processors may determine a phase of an abnormal communication state among at least one of the first communication module, the second communication module, and the controllers, when the abnormal communication state is determined.

The vehicle controller may determine, to an autonomous driving controller or a manual driving control configured for operation by a driver, a target to own one or more control rights over functions for supporting autonomous driving of the vehicle, based on the phase of the abnormal communication state.

The vehicle controller may determine, to the autonomous driving controller, a target to own all of the one or more control rights over the functions for supporting the autonomous driving of the vehicle, when the abnormal communication state is in a first phase.

The vehicle controller may determine, to the autonomous driving controller, the target to own some of the one or more control rights over the functions for supporting the autonomous driving of the vehicle, provide at least one of querying, via the manual driving control, the driver for the control right over the functions for supporting the autonomous driving of the vehicle, and determine a target to own the control right, depending on selection of the driver for the query, when the determined abnormal state phase of the controller is a second phase.

The vehicle controller may determine, to the manual driving control, a target to own the all of the one or more control rights over the functions for supporting the autonomous driving of the vehicle, when the abnormal communication state is in a third phase.

The vehicle controller may switch a target to own the control rights provided to the manual driving control to the autonomous driving controller, when manipulation of the manual driving control by the driver is not sensed for a specific time period.

BRIEF DESCRIPTION OF THE DRAWINGS

FIG. 2 illustrates abnormal states of a controller defined in each phase, according to an embodiment of the present disclosure.

FIG. 3 illustrates a control right defined in each phase, according to an embodiment of the present disclosure.

FIG. 4 illustrates an operation of providing a control right in an abnormal state in a second phase, according to an embodiment of the present disclosure.

FIG. 10 illustrates an abnormal communication state defined in each phase, according to an embodiment of the present disclosure.

FIG. 11 is a view illustrating an operation for determining a target to own a control right, according to an embodiment of the present disclosure.

Figure 1:
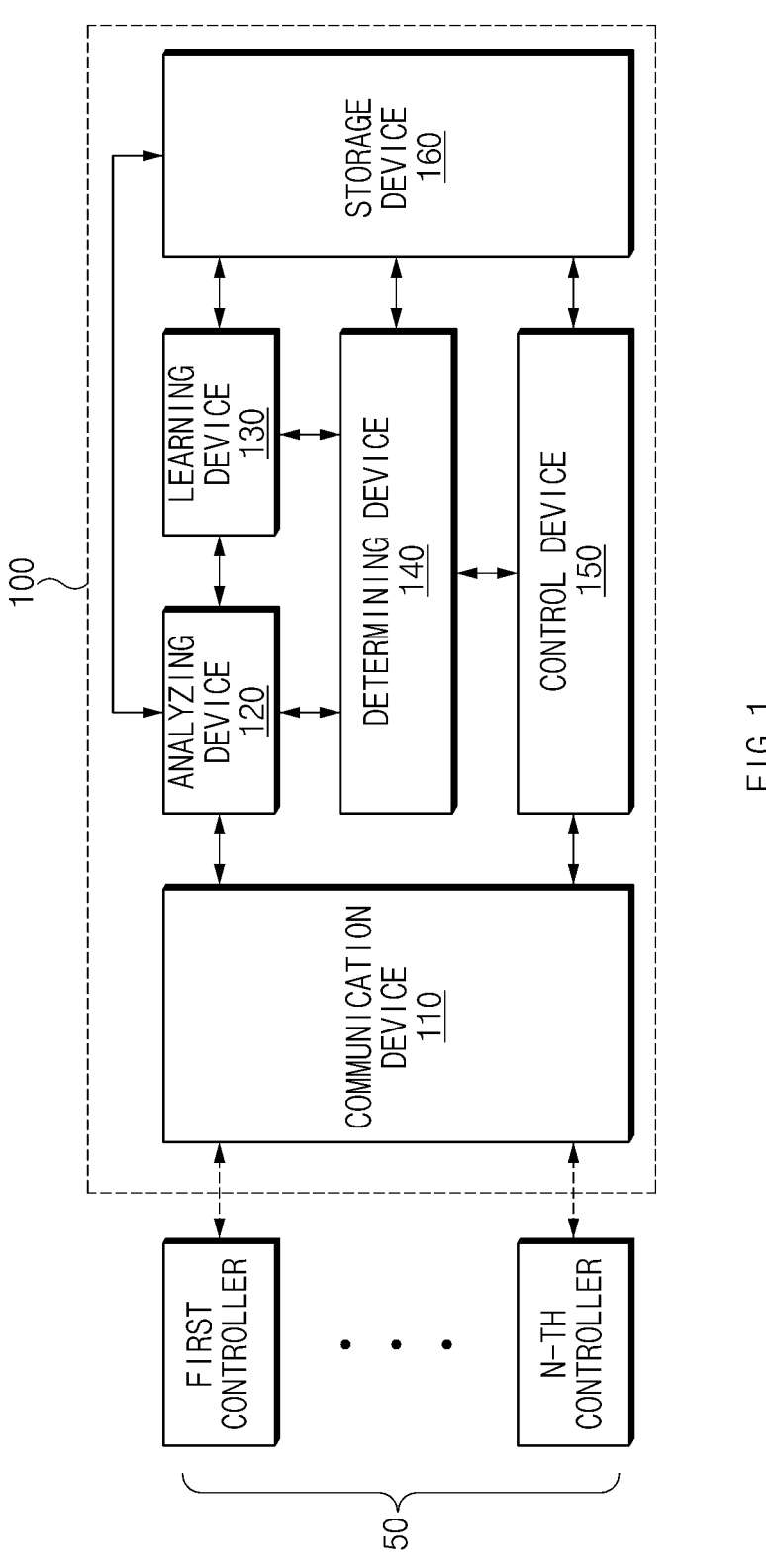
FIG. 1 is a view illustrating a configuration of a system for controlling a vehicle, based on the state of a controller, according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a," "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a view illustrating a configuration of a system for controlling a vehicle, based on the state of a controller according to an embodiment of the present disclosure.

Referring to FIG. 1, the system (hereinafter, a vehicle control system) for controlling a vehicle based on the state of the controller may include a communication device 110, an analyzing device 120, a learning device 130, a determining device 140, a control device 150 (for example, a vehicle controller), and a storage device 160. The communication device 110, analyzing device 120, learning device 130, determining device 140, and control device may be implemented via one or more processors.

The communication device 110 may include controllers (or in-vehicle controllers) 50 inside a vehicle and a communication module to make vehicle network communication. The technology for the vehicle network communication may include Controller Area Network (CAN) communication, Controller Area Network Flexible Data-Rate (CANFD), local interconnect network (LIN) communication, Flex-Ray communication, and Ethernet communication.

The communication device 110 may receive state information on each of the controllers 50 from the controllers 50 during driving. In this case, the controllers 50 may include a controller to support an autonomous driving function. The controllers 50 may include a sensor such as a camera, a radar, and a Lidar, and may control the operation of the sensor or process information obtained by the sensor.

For example, the controllers 50 may include a driving controller, such as Engine Management System (EMS), Electronic Stability Control (ESC), Electronic Stability Program (ESP), and Vehicle Dynamic Control (VDC). In addition, the controllers 50 may include an Advanced Driver Assistance System (ADAS) controller, such as Lane Keeping Assist System (LKAS), Highway Driving Assist (HDA), Smart Cruise Control (SCC)/Adaptive Cruise Control (ACC), Autonomous Emergency Brake (AEB)/Front Collision Avoidance assist (FCA), Highway Driving Pilot (HDP), Lane departure warning (LDW), Driver Attention Warning (DAW), or Driver State Warning (DSW).

Meanwhile, the communication device 110 may further include a communication module for performing communication with a roadside device (not illustrated; surrounding roadside device) and/or a surrounding vehicle (not illustrated) around the vehicle using a wireless Internet access scheme or a short-range communication scheme. The wireless Internet technology may include a wireless LAN (WLAN), a wireless broadband (Wibro), a Wi-Fi, World Interoperability for Microwave Access (Wimax). In addition, short-range communication technology may include Bluetooth, ZigBee, Ultra-Wideband (UWB), radio frequency identification (RFID), or infrared data association (IrDA).

When receiving the information of each controller through the communication device 110, the analyzing device 120 may analyze the state of each controller and the state of the sensor included in each controller, based on the received information.

In this case, the information of each controller received through the communication device 110 may include fault information of the sensors included in the controllers and calibration state information of sensor data, and may include information such as fault information of the controllers, response performance of each controller, a control volume of each controller, the timing to replace to replace each controller, and the frequency of use of each controller.

For example, the analyzing device 120 may analyze whether the timing to replace each controller has elapsed or whether the frequency of use of each controller exceeds the reference value based on the information received from each controller. In addition, the analyzing device 120 may analyze whether the failure information of the sensor is included among the information received from each controller, or whether the calibration state of the sensor data falls within a normal range. In addition, the analyzing device 120 may analyze whether the fault information of each controller is included in the information received from each controller, and whether the response performance of the controller and/or a control amount falls within the reference range.

The analyzing device 120 may provide a result (hereinafter, a controller state analysis result) obtained by analyzing the state of each controller to the learning device 130 and the determining device 140.

The learning device 130 learns the state of each controller based on the controller state analysis result from the analyzing device 120. For example, the learning device 130 may learn response performance such as the response time/ the reaction time, the speed, and the control amount of each controller.

In this case, the learning device 130 may select a plurality of control parameters necessary for maintaining basic performance of each controller and learn the parameter value of each controller for the selected plurality of control parameters. In this case, the learning device 130 may learn a reference range of a parameter value for maintaining basic performance of each controller, with respect to a plurality of control parameters previously selected.

In addition, the learning device 130 may compare a previous state information, which is previously learned, of a controller with present state information, which is presently learned, of the controller to learn the change in state of the controllers.

When learning of the state of the controller is completed, the learning device 130 may provide the learning result (hereinafter, a controller state learning result) to the determining device 140.

Accordingly, the determining device 140 may determine an aging state and/or an abnormal state for each controller, based on the controller state analysis result received from the analyzing device 120 and the controller state learning result received from the learning device 130.

For example, when the response performance of some or all of the controllers 50 does not satisfy the reference value, the determining device 140 may determine that the relevant controller is in the aging state.

In addition, the determining device 140 may determine whether the input values of each controller for a plurality of control parameters selected by the learning device 130 fall within the reference range and determine the controller as being in the abnormal state, when the input value is out of the reference range.

When determining the controller as being in the aging state or the abnormal state, the determining device 140 may determine the phase of an abnormal state of the controller.

The abnormal state of the controller may be divided into several phases. Hereinafter, an embodiment of dividing the abnormal state of the controller into several phases will be described with reference to FIG. 2.

Referring to FIG. 2, the abnormal state of the controller is divided into a first phase, a second phase, and a third phase, and the abnormal state condition may be defined for each phase in advance.

A first-phase controller abnormal state may be defined when no controller is abnormal or when a controller has a minor abnormality which does not affect vehicle control.

For example, when the response performance of the controller is equal to or greater than the minimum reference value (not affecting vehicle control), which falls within the normal range, even though some controllers are identified as being aged, the first-phase controller abnormal state may be determined as occurring.

A second-phase controller abnormal state may be defined when a controller has abnormality which partially affects vehicle controller.

For example, when an abnormality occurs only in the steering-related function of the controller, the second-phase controller abnormal state may be determined as occurring. In addition, when an abnormality occurs only in the acceleration/deceleration-related function of the controller, the second-phase controller abnormal state may be determined as occurring.

In addition, when the response performance of each controller is not abnormal, even though a controller related to the steering or acceleration/deceleration-related is identified as being aged, the second-phase controller abnormal state may be determined as occurring.

In addition, when a sensor is failed other than a front sensor, such as a camera, a radar, a Lidar, the second-phase controller abnormal state may be determined as occurring.

In addition, when abnormality occurs in the response performance of the all controller, the second-phase controller abnormal state may be determined as occurring.

A third-phase controller abnormal state may be defined when a controller has abnormality which significantly affects vehicle controller.

For example, when some controllers or all controllers are failed, the third-phase controller abnormal state may be determined as occurring. In addition, when all sensors of a controller relate to autonomous driving are failed, or when a front sensor, such as a camera, radar, or Lidar, is failed, the third-phase controller abnormal state may be determined as occurring. In addition, when a steering-related controller and an acceleration/deceleration-related controller among the controllers are failed, the third-phase controller abnormal state may be determined as occurring. In addition, when no controller respond, occurs in the response performance of the all controller, the third-phase controller abnormal state may be determined as occurring.

Although FIG. 2 illustrates some abnormal states defined in each phase, other abnormal states may be added to each phase.

As described above, when the abnormal state of the controller is identified, the determining device 140 may determine a phase corresponding to the identified abnormal state of the controller.

The determining device 140 may provide the determination result of an aging state or an abnormal state of the controller, to the control device 150.

The control device 150 (for example, a vehicle controller) may be connected to each component of the vehicle control system to perform an overall function of the vehicle control system. In this case, the control device 150 may be a hardware device, such as a processor or a central processing unit (CPU), or a program implemented by a processor.

When the abnormal state of the controller is identified, the control device 150 may inform the driver to the abnormal state of the controller. For example, the control device 150 may turn on a warning light corresponding to the abnormal state of a controller in each phase, or may output an alarm sound or a guide sound.

When the aging state or abnormal state of each controller is identified, the control device 150 may provide a control right over functions related to driving of the vehicle to either the autonomous driving controller or the driver, depending on abnormal states of the controllers. In this case, the functions related to driving of the vehicle may correspond to functions controlled by an autonomous driving controller such as an ADAS.

The control right in each phase depending on the abnormal state of the controller may be defined as illustrated in FIG. 3.

Referring to FIG. 3, in the first-phase controller abnormal state, the whole control right over the functions for supporting the autonomous driving of the vehicle may be provided to the autonomous driving controller.

In the second-phase controller abnormal state, the partial control right over the functions for supporting the autonomous driving of the vehicle may be provided to the autonomous driving controller. However, in the second-phase controller abnormal state, a target to receive each control right may be changed depending on the selection of a driver.

For example, in the second-phase controller abnormal state, when the control right for the steering control function is provided to the autonomous driving controller, the relevant control right may be switched from the autonomous driving controller to the driver, depending on the selection of the driver.

In the third-phase controller abnormal state, the whole control right over the functions for supporting the autonomous driving of the vehicle may be provided to the driver. However, when the driver operation is not detected for a specific time, the target to receive the control right may be switched to the autonomous driving controller.

As described above, when an abnormal state of the controller is identified, the control device 150 may provide the control right over the functions for supporting the autonomous driving of the vehicle, to the autonomous driving controller or the driver, based on the target to receive a control right defined in each phase of the controller abnormal state illustrated in FIG. 3.

For example, when the control device 150 may provide the whole control right over the functions for supporting the autonomous driving of the vehicle, to the autonomous driving controller, in the first-phase controller abnormal state. Accordingly, the autonomous driving controller may control all functions for supporting the autonomous driving of the vehicle.

However, when a request is made by the driver to switch some control rights or all control rights over the functions for supporting the autonomous driving of the vehicle even in the first-phase controller abnormal state, the control device 150 may switch some control rights or all control rights over the functions for supporting the autonomous driving of the vehicle to the driver, in response to the request by the driver.

In addition, the control device 150 may provide the control right over some functions for supporting the autonomous driving to the autonomous driving controller, or may provide a control right over remaining functions to the driver (for example, through a manual driving control system), in the second-phase controller abnormal state. Accordingly, the autonomous driving controller may control some functions for supporting the autonomous driving of the vehicle.

In the second-phase controller abnormal state, the control device 150 may query the driver, for example, via the manual driving control, for the control right over some functions. In this case, the control device 150 may provide the control right over the relevant function to the autonomous driving controller or the driver, depending on the selection of the driver for the query (for example, based on the driver's selection in response to the query).

The operation of providing the control right will be described with reference to FIG. 4, depending on the abnormal state of the controller, in the second-phase controller abnormal state.

Referring to FIG. 4, the control device 150 may provide the control right over the function of controlling the acceleration/deceleration to the autonomous driving controller when determining the second-phase controller abnormal state as occurring due to the abnormality in the steering-related function or the response performance of the steering-related controller.

The control device 150 may provide the control right over the function of controlling the acceleration/deceleration to the autonomous driving controller, when determining the second-phase controller abnormal state as occurring due the steering-related controller aged However, the control device 150 may provide the control right over the function of controlling the acceleration/deceleration to the driver, depending on the selection of the driver, even when determining the second-phase controller abnormal state as occurring due the steering-related controller aged The control device 150 may provide the control right over the function of controlling steering to the driver, when determining the second-phase controller abnormal state as occurring, due to the abnormality in the acceleration/deceleration-related function or the response performance of the acceleration/deceleration-related controller.

In addition, the control device 150 may provide the control right over the function of controlling the steering to the driver, when determining the second-phase controller abnormal state as occurring due the acceleration/deceleration-related controller aged However, the control device 150 may provide the control right over the function of controlling the steering to the driver, depending on the selection of the driver, even when determining the second-phase controller abnormal state as occurring due the acceleration/deceleration-related controller aged Meanwhile, the control device 150 may provide, to the autonomous driving controller or the driver, the control rights over the functions for supporting the autonomous driving of the vehicle, for example, a function (acceleration/deceleration control function) of controlling acceleration/deceleration and a function (steering control function) of controlling steering, when determining the communication state of the vehicle as the second-phase controller abnormal state, due to the failure of the sensor other than the front sensor.

For example, when the control device 150 may provide the whole control right over the functions for supporting the autonomous driving of the vehicle, to the driver (for example, to a system for performing manual driving control), in the third-phase controller abnormal state. Accordingly, the autonomous driving controller releases the control over the function for supporting the autonomous driving of the vehicle, such that the vehicle is manually driven by the manipulation of the driver.

As described above, the condition for a target to receive a control right may be variously defined, depending on the abnormal states of a controller in each phase. However, the control right over a specific function may be changed depending on the abnormal state of the controller in each phase, in response to the request by the driver. However, when a request is made by the driver to switch some control rights or all control rights over the functions for supporting the autonomous driving of the vehicle, after informing the driver of the abnormal state of the controller, the control device 150 may switch some control rights or all control rights over the functions for supporting the autonomous driving of the vehicle, in response to the request by the driver.

In addition, the target to receive the control right over the functions for supporting the autonomous driving of the vehicle may be switched depending on the situation of the driver For example, when the driver is unable to perform a manipulation, due to drowsiness or a heart attack, and the driver has the control right, an accident may occur.

Accordingly, when the manipulation of the driver is not sensed, after providing, to the driver, some or all control right over the functions for supporting the autonomous driving of the vehicle, the control device 150 may switch the control right provided to the driver to the autonomous driving controller. For example, when the manipulation of the driver is not sensed in the state that the control right over an acceleration/deceleration control function or a steering control function is provided to the driver, the control device 150 switches the control right over the functions to the autonomous driving controller to prevent accident which is to be caused through non-manipulation.

The storage device 160 may store data and/or an algorithm necessary for the vehicle control system 100 to operate.

For example, the storage device 160 may store a state analysis result for the controllers 50, and state learning data for the controllers 50. In addition, the storage device 160 may store a command and/or an algorithm for determining the abnormal state of the controller, based on state analysis results and state learning results of the controllers 50, and may store a command and/or an algorithm to provide a control right in each phase of the abnormal state of the controller.

In this case, the storage device 160 may include a storage medium such as an RAM, SRAM, ROM, PROM, or EEPROM.

Meanwhile, although not illustrated in FIG. 1, the vehicle control system according to the present disclosure may further include an interface device which informs an abnormal state of the controller and provides a control selection screen for functions for supporting autonomous driving of the vehicle to the driver.

The interface device may include an input unit to receive a command from a user, such as a driver, and an output unit to output an operation state and a result of the vehicle control system 100.

In this case, the input unit may include a key button and may include a soft key implemented on the display. In addition, the input unit may include a mouse, a joystick, a jog shuttle, or a stylus pen.

The output unit may include a display, and may include a voice output unit such as a speaker. In this case, when a touch sensor, such as a touch film, a touch sheet, or a touch pad is provided on the display, the display operates as a touch screen, and may be implemented in a form in which the input unit and the output unit are integrated.

Hereinafter, the operation flow of the vehicle control system according to the present disclosure configured as described above will be described in more detail.

Figure 5:
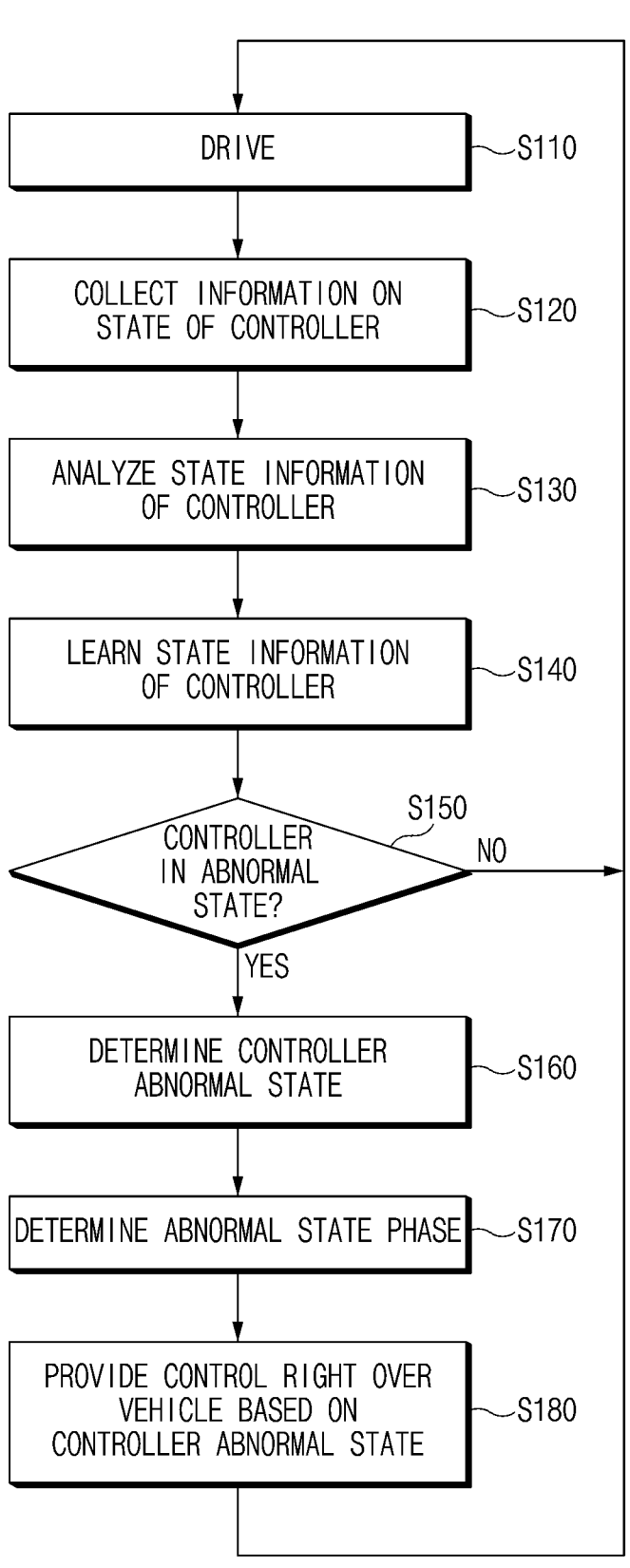
FIG. 5 is a flowchart illustrating operations in a method for controlling a vehicle, based on the state of a controller, according to an embodiment of the present disclosure.
Figure 6:
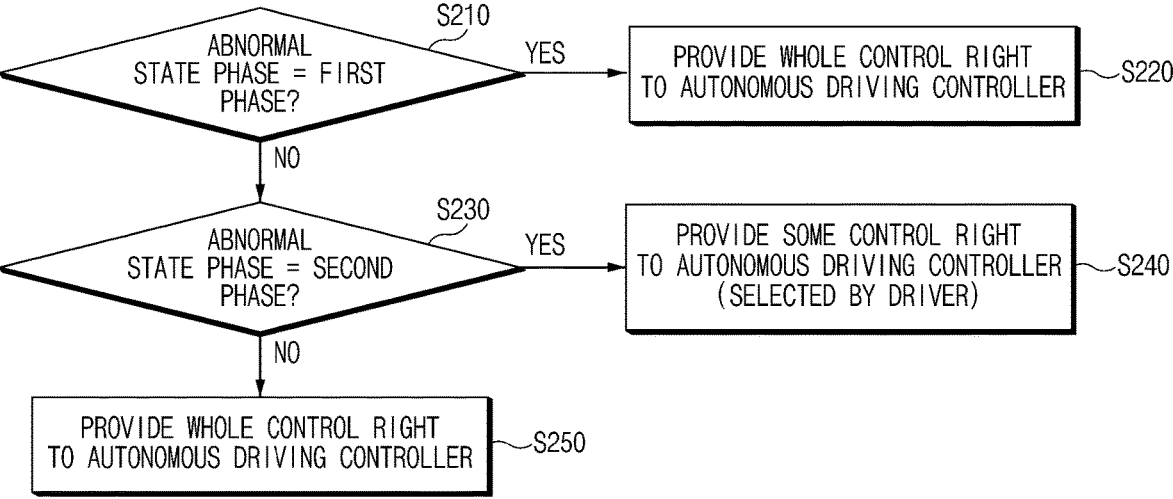
FIGS. 6 and 7 are flowcharts illustrating detailed operations of an operation to provide a control right of FIG. 5.
Figure 7:
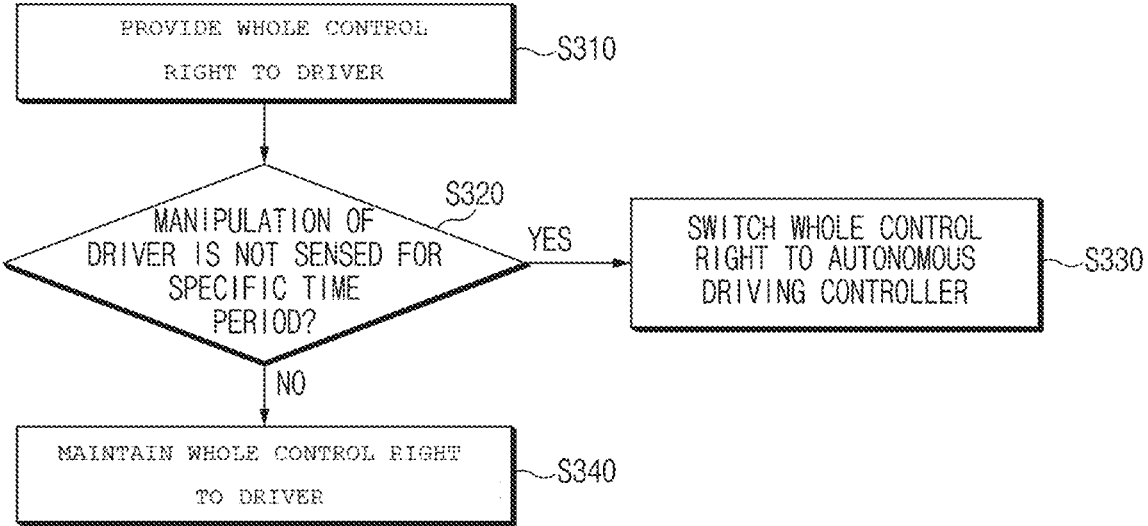

FIG. 5 is a flowchart illustrating operations in a method for controlling a vehicle, based on the state of a controller, according to an embodiment of the present disclosure, and FIGS. 6 and 7 are flowcharts illustrating detailed operations of an operation to provide a control right of FIG. 5.

First, referring to FIG. 5, the vehicle control system collects state information of the controller (S120), during vehicle driving (S110). In S120, the vehicle control system may monitor the state of each controller and collect the state information in real time or at specific time interval, during the driving of the vehicle.

The vehicle control system analyzes the state of each controller based on the state information of the controller, which is collected in S120 (S130), and learns the state of each controller, based on the state analysis result in S130. In S140, the vehicle control system may select control parameters necessary for maintaining the normal performance of each controller, and may learn a parameter value input from each controller in relation to the selected control parameter.

The vehicle control system determines whether each controller is in an abnormal state, based on the controller state analysis result in S130 and the controller state learning result in S140. When the state of each controller not abnormal (S150), the vehicle control system iterates S120 to S150, in real time or every specific period.

Meanwhile, when at least one of each controller is determined as being abnormal in S150, the vehicle control system determines the abnormal state of the relevant controller (S160), and determines the phase of the abnormal state of the controller determined in S160 (S170).

In this case, the vehicle control system provides control right over the functions for supporting the autonomous driving of the vehicle, based on a controller abnormal state determined in S170 (S180).

Hereinafter, the flow of the detailed operation of S180 will be described with reference to embodiments of FIGS. 6 and 7.

Referring to FIG. 6, the vehicle control system provides the control right over the functions for supporting the autonomous driving of the vehicle to the autonomous driving controller (S220), when the phase of the controller abnormal state determined in S160 and S170 of FIG. 5 is the first phase (S210).

Meanwhile, the vehicle control system provides some control rights over the functions for supporting the autonomous driving of the vehicle to the autonomous driving controller (S240), when the phase of the controller abnormal state determined in S160 and S170 of FIG. 5 is the second phase (S230). In this case, the vehicle control system may provide, to the autonomous driving controller, a control right over a function, which is defined to correspond to the second-phase controller abnormal state in advance, the functions for supporting the autonomous driving of the vehicle. In addition, the vehicle control system may provide, to the autonomous driving controller, a control right over some functions selected by the driver.

Meanwhile, the vehicle control system provides the whole right over the functions for supporting the autonomous driving of the vehicle to the autonomous driving controller (S250), when the phase of the controller abnormal state determined in S160 and S170 of FIG. 5 is the third phase.

In this case, as illustrated in FIG. 7, the vehicle control system may switch the whole control right provided to the driver to the autonomous driving controller to prevent an accident from being caused, as the driver does not drive (S330), when the whole control right over the functions for supporting the autonomous driving of the vehicle is provided to the driver (S310) and then the driving of the driver is not sensed for the time period of 't' (S320).

Meanwhile, when the driving of the driver is determined as being sensed for the time period of T in S320, the vehicle control system maintains the control right of the driver provided in S310 (S340).

Figure 8:
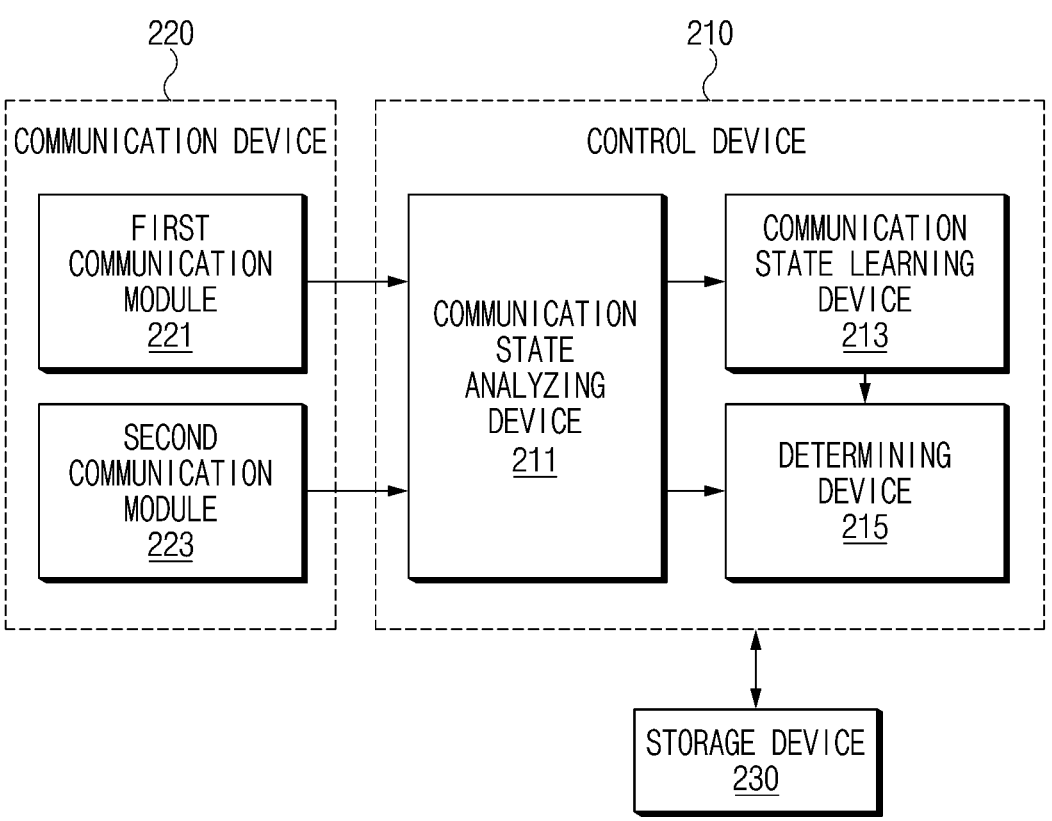
FIG. 8 is a view illustrating a configuration of a system for controlling a vehicle, based on a communication state, according to an embodiment of the present disclosure.

FIG. 8 is a view illustrating a configuration of a system for controlling a vehicle, based on a communication state according to an embodiment of the present disclosure.

Referring to FIG. 8, the vehicle control system based on a communication state may include a control device 210, a communication device 220, and a storage device 230.

The control device 210 may be connected to each component of the vehicle control system to perform the overall function of the vehicle control system. In this case, the control device 210 may be a hardware device, such as a processor or a central processing unit (CPU), or a program implemented by a processor.

The control device 210 may analyze and learn the communication state of the communication device 220 to determine whether a present communication state of the vehicle is abnormal, and may determine a target to own a control right for each function related to the driving of the vehicle in each phase of an abnormal communication state.

The communication device 220 may include a first communication module 221 which makes communication with controllers inside the vehicle, and a second communication module 223 which makes communication with a roadside device (Infra) and/or a surrounding vehicle around the vehicle.

The first communication module 221 may be a module for vehicle network communication with controllers provided in the vehicle. In this case, the technology for the vehicle network communication may include Controller Area Network (CAN) communication, Controller Area Network Flexible Data-Rate (CANFD), local interconnect network (LIN) communication, Flex-Ray communication, and Ethernet communication.

The communication structure of the first communication module 221 will be described with reference to an embodiment of FIG. 9A.

Figure 9A:
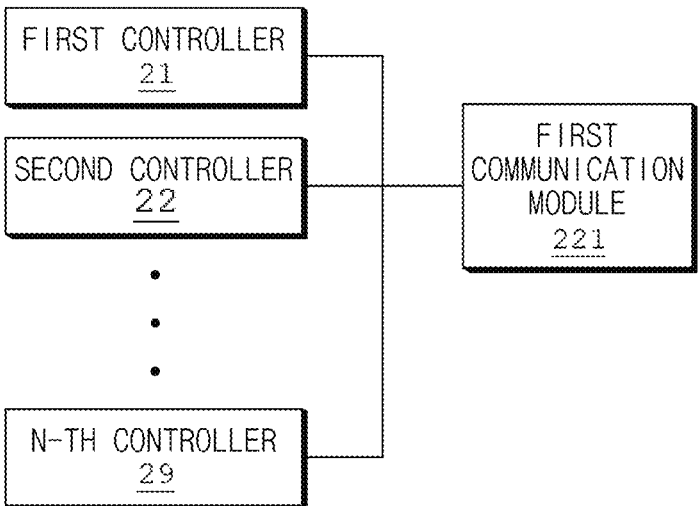
FIG. 9A is a view illustrating an operation for detecting a vehicle network communication state, according to an embodiment of the present disclosure.

As illustrated in FIG. 9A, the first communication module 221 includes a plurality of controllers 21 to 29, such as a first controller for example, controller 1, controller 2, . . . , controller N provided inside the vehicle. In this case, the controller may include sensors such as a camera, a radar, and a Lidar provided in the vehicle.

In this case, the control device 210 may analyze and learn the vehicle network communication state between the first communication module 221 and each of the controllers 21 to 29, and determine whether the communication state is abnormal.

The second communication module 223 may be a module for vehicle to X (V2X) communication. For example, the second communication module 223 may support vehicle to infrastructure (V2I) communication with the roadside device (Infra) 20 and/or vehicle to vehicle (V2V) communication with the surrounding vehicle 30.

The second communication module 223 may perform V2X communication through a wireless Internet access scheme or a short-range communication scheme. The wireless Internet technology may include a wireless LAN (WLAN), a wireless broadband (Wibro), a Wi-Fi, or World Interoperability for Microwave Access (Wimax). In addition, the short-range communication technology may include Bluetooth, ZigBee, Ultra-Wideband (UWB), radio frequency identification (RFID), or infrared data association (IrDA).

The communication structure of the second communication module 223 will be described with reference to FIG. 9B.

Figure 9B:
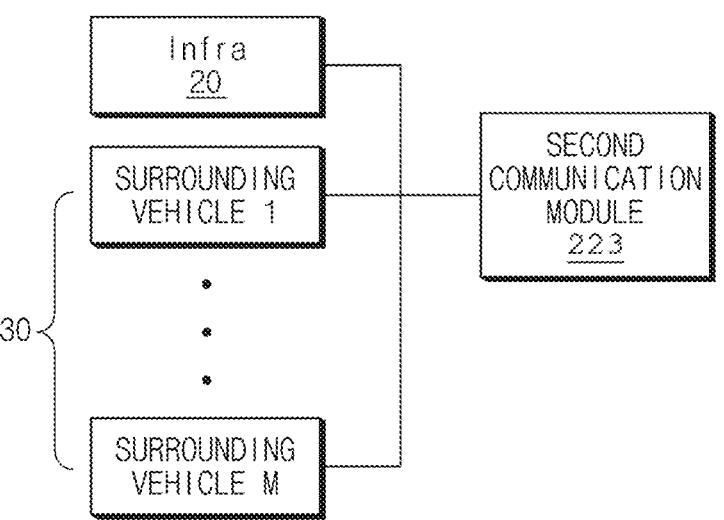
FIG. 9B is a view illustrating an operation for detecting a V2X communication state, according to an embodiment of the present disclosure.

As illustrated in FIG. 9B, the second communication module 223 may transmit and receive signals through V2I communication with the roadside device (Infra) 30 positioned around the vehicle. In addition, the second communication module 223 may transmit and receive signals to and from the surrounding vehicle 30 through V2V communication.

In this case, the control device 210 may analyze and learn the V2X communication state between the second communication module 223, the roadside device 20 and/or the surrounding vehicle 30, to determine whether the communication state is abnormal.

The storage device 230 may store data and/or an algorithm necessary for the vehicle control system 100 to operate.

For example, the storage device 230 may store a communication state analysis result for vehicle network communication and V2X communication with the controllers 21 to 29, and may store communication state learning data. In addition, the storage device 230 may store a command and/or an algorithm for determining the abnormal communication state, based on the communication state analysis result and the communication state learning data, and may store a command and/or an algorithm to determine a target to own the control right in each phase of the abnormal communication state.

In this case, the storage device 230 may include a storage medium such as a RAM, SRAM, ROM, PROM, or EEPROM.

Referring to FIG. 8, the control device 210 may include a communication state analyzing device 211, a communication state learning device 213, and a determining device 215.

The communication state analyzing device 211 analyzes a vehicle network communication state based on data transmitted/received by the first communication module 221.

Each of the controllers 21 to 29 may be in a state in which communication performance is deteriorated or communication is failed, due to aging or failure. In addition, the performance of the communication with the controllers 21 to 29 may be deteriorated or the communication with the controllers 21 to 29 may be failed, due to the failure or the aging of the first communication module 221.

Accordingly, the communication state analyzing device 211 analyzes the communication state of the vehicle network, based on communication data when making communication with each of the controllers 21 to 29 through the first communication module 221.

In this case, the communication state analyzing device 211 may determine a communication speed between the first communication module 221 and each of the controllers 21 to 29. In addition, the communication state analyzing device 211 may determine the communication connection state between the first communication module 221 and each of the controllers 21 to 29 to determine whether communication is failed.

In addition, the communication state analyzing device 211 may determine the consistency of data received from each controller through the first communication module 221 In this case, the communication state analyzing device 211 may check the consistency of data by performing a data error check such as CRC (Cyclic redundancy check) on communication data with each of the controllers 21 to 29.

In addition, the communication state analyzing device 211 may determine the failure state and/or calibration state of each of the controller 21 to 29, based on the data received from each of the controller 21 to 29 through the first communication module 221.

The communication state analyzing device 211 analyzes a V2X communication state based on data transmitted/received by the second communication module 223. In this case, the communication state analyzing device 211 may analyze the V2I communication state between the second communication module 223 and the roadside device (Infra) 20 around the vehicle, and the V2V communication state between the second communication module 223 and a surrounding vehicle.

First, the communication state analyzing device 211 may analyze a communication state, based on V2I communication data transmitted and received through V2I communication between the second communication module 223 and the surrounding roadside device (Infra) 20. In this case, the communication state analyzing device 211 may determine a communication speed between the second communication module 223 and the surrounding roadside device 20. In addition, the communication state analyzing device 211 may determine the communication connection state between the second communication module 223 and the surrounding roadside device 20 to determine to determine whether communication is failed.

In addition, the communication state analyzing device 211 may analyze the consistency of data transmitted and received through V2I communication between the second communication module 223 and the roadside device 20. In this case, the communication state analyzing device 211 may determine the consistency of data by performing a data error check, such as CRC (Cyclic redundancy check), on V2I communication data.

In addition, the communication state analyzing device 211 may analyze the suitability of data transmitted and received through V2I communication between the second communication module 223 and the roadside device 20. In this case, the communication state analyzing device 211 may determine whether the corresponding V2I communication data is suitable by determining whether the information obtained from the V2I communication data is matched to the information obtained from sensors installed in the vehicle. For example, the communication state analyzing device 211 may determine the corresponding V2I communication data as being suitable by determining whether the information on a vehicle position and a vehicle state, which are obtained from the V2I communication data, is matched to the information obtained from sensors installed in the vehicle.

First, the communication state analyzing device 211 may analyze a communication state, based on V2V communication data transmitted and received through V2V communication between the second communication module 223 and the surrounding roadside device (Infra) 20. In this case, the communication state analyzing device 211 may determine a communication speed between the second communication module 223 and the surrounding vehicle 30. In addition, the communication state analyzing device 211 may determine the communication connection state between the second communication module 223 and the surrounding vehicle 30 to determine to determine whether communication is failed.

In addition, the communication state analyzing device 211 may analyze the consistency of data transmitted and received through V2V communication between the second communication module 223 and the roadside device 20. In this case, the communication state analyzing device 211 may determine the consistency of V2V communication data by performing a data error check, such as CRC (Cyclic redundancy check), on V2V communication data.

In addition, the communication state analyzing device 211 may analyze the consistency of data transmitted and received through V2V communication between the second communication module 223 and the surrounding vehicle 30. In this case, the communication state analyzing device 211 may determine whether the corresponding V2V communication data is suitable by determining whether the information obtained from the V2V communication data is matched to the information obtained from sensors installed in the vehicle. For example, the communication state analyzing device 211 may determine the relevant V2V communication data as being suitable, when map data, traffic information, and/or road information obtained from the V2V communication data is matched to information obtained from sensors inside the vehicle.

In this case, the communication state analyzing device 211 may provide the analysis result of the vehicle network communication state through the first communication module 221, and the analysis result of the V2I and V2V communication states through the second communication module 223 to the communication state learning device 213 and the determining device 215.

The communication state learning device 213 learns the communication state based on the communication state analysis result of the communication state analyzing device 211. In this case, the communication state learning device 213 may learn a communication state of the first communication module 221 and the second communication module 223, and may learn a communication state of each of the controllers 21 to 29.

For example, the communication state learning device 213 may learn a communication speed and a communication state for each region and/or each terrain, for vehicle network communication between the first communication module 221 and the controllers 21 to 29, and may learn a communication speed and a communication state for each attribute of data transmitted and received.

In addition, the communication state learning device 213 may learn communication speed and communication state for each region and/or each terrain for V2I communication between the second communication module 223 and the surrounding roadside device 20, and learn a communication speed and a communication state for each attribute of data transmitted and received, and learn the consistency and suitability of the data.

In addition, the communication state learning device 213 may learn communication speed and communication state for each region and/or each terrain for V2V communication between the second communication module 223 and the surrounding roadside device 20, learn a communication speed and a communication state for each attribute of data transmitted and received, and learn the consistency and suitability of the data.

When the learning on the communication state is completed, the communication state learning device 213 may provide a communication state learning result to the determining device 215.

Accordingly, the determining device 215 may determine the abnormal communication state of the vehicle network communication by the first communication module 221 and V2X communication by the second communication module 223, based on the communication state analysis result received from the communication state analyzing device 211 and the communication state learning result received from the communication state learning device 213, For example, the determining device 215 may determine that the controller is aged or failed, when the communication speed between a specific controller of the controllers 21 to 29 and the first communication module 221 is continuously decreased, or the frequency of communication disconnection is increased. In addition, the determining device 215 may determine the first communication module 221 and/or controllers 21 to 29 as being aged or failed, when the communication speed between the controllers 21 to 29 and the first communication module 221 is totally decreased, or the frequency of communication disconnection is increased.

In this case, in the vehicle network communication, the communication speed may be decreased or communication may be disconnected, due to the aging or the failure of the first communication module 221, or the aging or the failure of some controllers. Accordingly, the determining device 215 may find a target aged or failed, by comparing between the first communication module 221 and the controllers 21 to 29 in communication speed and communication state, or by comparing between the first communication module 221, and the controllers 21 to 29 in communication speed and communication state which are learned previously.

In addition, the determining device 215 may determine whether the relevant controller is aged or failed, depending on whether the consistency of communication data between the first communication module 221 and some controllers is failed.

In this case, the control device 210 outputs the notification of an aging state or a failure state for vehicle network communication with the target controller, such that that the driver may recognize the abnormal communication state of the vehicle network.

In addition, the determining device 215 may determine the second communication module 223 as being aged or failed, when the communication speed is continuously decreased the frequency of communication disconnection is increased in V2X communication (V2I communication and/or V2V communication) by the second communication module 223.

In addition, the determining device 215 may determine the aging or failure state of the second communication module 223 depending on whether the communication data represents the lower consistency or suitability, during V2X communication (V2I communication and/or V2V communication) by the second communication module 223.

In this case, the control device 210 outputs the notification of the aging state and the failure state for the V2I communication and/or V2V communication, such that the driver may recognize the abnormal communication state for V2I communication and/or V2V communication.

As described above, when the abnormal communication state for vehicle network communication, V2I communication, and/or V2V communication is identified, the control device 210 may determine the target to own a control right over functions related to the driving of the vehicle depending on the abnormal communication state of the vehicle. In this case, the functions related to driving of the vehicle may correspond to functions controlled by an autonomous driving controller such as an ADAS.

The abnormal communication state of the vehicle may be divided into several phases. Hereinafter, an embodiment of dividing the abnormal communication state of the vehicle into several phases will be described with reference to FIG. 10.

Referring to FIG. 10, the abnormal communication state of the vehicle is divided into a first phase, a second phase, and a third phase, and the abnormal communication state for each phase may be defined.

An abnormal communication state in a first phase may be defined when minor abnormality, which does not affect vehicle control, occurs in communication through the first communication module 221 or the second communication module 223.

For example, when the communication response performance between the first communication module 221 and the relevant controller is equal to or greater than the minimum reference value (not affecting vehicle control), even though some controllers are identified as being aged, the abnormal communication state in the first phase may be determined as occurring.

An abnormal communication state in a second phase may be defined when communication abnormality, which does not partially affect vehicle control, occurs in communication through the first communication module 221 or the second communication module 223.

For example, when the V2I communication data shows the lower consistency or suitability, the abnormal communication state in second phase may be determined as occurring. In other words, when information on a position, a road, and/or a weather condition on map data obtained from the V2I communication data may be different from information obtained from the internal sensor of the vehicle, to partially affect the autonomous driving function of the vehicle, the abnormal communication state in the second phase may be determined as occurring.

For example, when the V2V communication data shows the lower consistency or suitability, the abnormal communication state in second phase may be determined as occurring. In other words, when information on the position, the speed, and/or the vehicle state of the surrounding vehicle 30 is different from information obtained from the internal sensor of the vehicle, to partially affect the autonomous driving function of the vehicle, the abnormal communication state in the second phase may be determined as occurring.

In addition, although communication abnormalities, such as a temporary slowdown or intermittent disconnection in a vehicle network communication speed, occurs through the first communication module 221, when the communication abnormalities are complemented by using communication data received through V2X communication through the second communication module 223, the abnormal communication state in the second phase may be determined as occurring.

Similarly, although communication abnormalities, such as a temporary slowdown in a vehicle network communication speed or intermittent disconnection, occurs through the second communication module 223, when the communication abnormalities are complemented by using sensor data received from the controllers 21 to 29 through the second communication module 221, the abnormal communication state in the second phase may be determined as occurring.

In addition, when the first communication module 221 and/or the second communication module 223 is determined as being aged, the abnormal communication state in the second phase may be determined as occurring.

An abnormal communication state in a third phase may be defined when big (for example, large) abnormality, which significantly affects vehicle control, occurs in communication through the first communication module 221 or the second communication module 223.

For example, when vehicle network communication through the first communication module 221 is failed or when the communication speed by the first communication module 221 becomes lowered to fail to process real-time data, the abnormal communication state in the second phase may be determined as occurring. For example, when V2X communication through the second communication module 223 is failed or when the communication speed by the second communication module 223 becomes lowered to fail to process real-time data, the abnormal communication state in the third phase may be determined as occurring.

For example, when the V2X communication data shows the lower consistency or suitability, the abnormal communication state in third phase may be determined as occurring.

Accordingly, when the abnormal communication state of the vehicle is determined as occurring, the determining device 140 may determine the phase corresponding to the determined abnormal communication state.

When the abnormal communication state of the vehicle is determined as occurring, the control device 210 may inform the driver to the abnormal communication state of the vehicle. For example, the control device 210 may turn on a warning lamp, an alarm sound, or a guide sound to correspond to the abnormal communication state in each phase.

In addition, the control device 210 may determine a target to own a control right over the functions for supporting the autonomous driving of the vehicle, depending on the abnormal communication state of each phase, and may switch the target to own the control right over the functions, based on the determination result.

In this case, the control device 210 may determine a target to own a control right over the functions for supporting the autonomous driving in each phase, depending on the abnormal communication state of each phase, For example, when the control device 210 may determine, to the autonomous driving controller, a target to own the whole control right over the functions for supporting the autonomous driving of the vehicle, to the autonomous driving controller, in the abnormal communication state in the first phase. Accordingly, the autonomous driving controller may control all functions for supporting the autonomous driving of the vehicle, depending on the determination of the control device 210.

However, when a request is made by the driver to switch some control rights or all control rights over the functions for supporting the autonomous driving of the vehicle even in the abnormal communication state in the first phase, the control device 210 may switch some control rights or all control rights over the functions (or control rights over some of the functions) for supporting the autonomous driving of the vehicle to the driver, in response to the request by the driver.

In addition, the control device 210 may provide the control right over some functions for supporting the autonomous driving to the autonomous driving controller, or may determine, to the driver, a target to own a control right over remaining (for example, portion of) functions to the driver, in the abnormal communication state in the second phase. Accordingly, the autonomous driving controller may control some functions for supporting the autonomous driving of the vehicle, depending on the determination of the control device 210.

In the abnormal communication state in the second phase, the control device 210 may query the driver for the target to own the control right over some of the functions. In this case, the control device 210 may determine the target to own the control right over the relevant function to the autonomous driving controller or the driver, depending on the selection of the driver for the query.

The operation of determining the target to own the control right depending on the abnormal communication state, the abnormal communication state in the second phase occurs, will be described with reference to FIG. 4.

Referring to FIG. 11, when it is determined that the communication state of the vehicle is the abnormal communication state in the second phase, as the first communication module 221 or the second communication module 223 is aged, the control device 210 guides the driver such that the driver selects the target to own the control right over the function for supporting the autonomous driving of the vehicle. Accordingly, the driver may select a function to be controlled by the autonomous driving controller or functions to be controlled by the driver. Accordingly, the control device 210 may determine the target to own the control right over the functions, such as the acceleration/deceleration control function and the steering control function, for supporting the autonomous driving of the vehicle, depending on the selection of the driver.

The control device 210 may determine, to the autonomous driving controller, the target to own the control right over the acceleration/deceleration control function, when determining the communication state of the vehicle as the abnormal communication state in the second phase, due to the failure in state of the communication of the vehicle network by the first communication module 221, although the V2X communication by the second communication module 223 is not abnormal when the vehicle travels on a road having a speed limit equal to or less than a specific speed V In this case, the control device 210 may determine the target to own the control right over the remaining functions other than the acceleration/deceleration control function, to the driver, or may determine the target to own the control right to the driver.

The control device 210 may determine the target to own the control right over the function of controlling the acceleration/deceleration to the autonomous driving controller, when determining the communication state of the vehicle to the abnormal communication state in the second phase, due to the abnormality in the steering-related function or the response performance of the steering-related controller.

In addition, the control device 210 may determine the target to own the control right over the function of controlling the acceleration/deceleration to the autonomous driving controller, when determining the communication state of the vehicle to the abnormal communication state in the second phase, as the steering-related controller is aged. However, the control device 210 may determine the target to own the control right over the acceleration/deceleration control function, depending on the selection of the driver.

The control device 210 may determine, to the driver, the target to own the control right over the steering control function, when determining the communication state of the vehicle to the abnormal communication state in the second phase, due to the abnormality in the acceleration/deceleration-related function or the response performance of the acceleration/deceleration-related controller.

In addition, the control device 210 may determine the target to own the control right over the steering control function, even when determining the communication state of the vehicle to the abnormal communication state in the second phase, as the acceleration/deceleration-related controller is aged. However, the control device 210 may determine, to the autonomous driving controller, the target to own the control right over the steering control function, depending on the selection of the driver.

The control device 210 may determine, depending on the selection of the driver, a target to own a control right over the functions (for example, the acceleration/deceleration control function and the steering control function) for supporting the autonomous driving of the vehicle, when determining the communication state of the vehicle as the abnormal communication state in the second phase, due to the failure of the sensor such as a front sensor.

Meanwhile, when the control device 210 may determine, to the driver, a target to own the whole control right over the functions for supporting the autonomous driving of the vehicle, in the abnormal communication state in the third phase. Accordingly, the autonomous driving controller releases, depending on the determination of the control device 210, the control over the functions for supporting the autonomous driving of the vehicle, such that the vehicle is manually driven by the manipulation of the driver.

As described above, the condition for determining the target to own the control right depending on the abnormal communication state in each phase may be defined in advance. However, the control right over a specific function may be changed depending on the abnormal communication state in each phase, in response to the request by the driver. However, when a request is made by the driver to switch a target to own some control rights or all control rights over the functions for supporting the autonomous driving of the vehicle, after informing the driver of the abnormal communication state of the vehicle, the control device 210 may switch the target to own some control rights or all control rights over the functions for supporting the autonomous driving of the vehicle, in response to the request by the driver.

In addition, the target to own the control right over the functions for supporting the autonomous driving of the vehicle may be switched depending on the situation of the driver. For example, when the driver is unable to perform a manipulation, due to drowsiness or a heart attack, and the driver has the control right, an accident may occur.

Accordingly, when the manipulation of the driver is not sensed for a specific time period, after determining, to the driver, the target to own some or all control right over the functions for supporting the autonomous driving of the vehicle, the control device 210 may switch the target to own the control right provided to the driver to the autonomous driving controller. For example, when the manipulation of the driver is not sensed in the state that the target to own the control right over an acceleration/deceleration control function or a steering control function is determined to the driver, the control device 210 switches the target to own the control right over the functions to the autonomous driving controller to prevent accident which is to be caused through non-manipulation.

Although not illustrated in FIG. 8, the vehicle control system according to the present disclosure may further include an interface device to inform the abnormal communication state of the vehicle, and to provide, to the driver, and a screen for selecting a target to own a control right over the functions for supporting the autonomous driving of the vehicle The interface device may include an input unit to receive a command from a user, such as a driver, and an output unit to output an operating state and a result of the vehicle control system 100.

In this case, the input unit may include a key button and may include a soft key implemented on the display. In addition, the input unit may include a mouse, a joystick, a jog shuttle, or a stylus pen.

The output unit may include a display, and may include a voice output unit such as a speaker. In this case, when a touch sensor, such as a touch film, a touch sheet, or a touch pad is provided on the display, the display operates as a touch screen, and may be implemented in a form in which the input unit and the output unit are integrated.

Hereinafter, the operation flow of the vehicle control system according to the present disclosure configured as described above will be described in more detail.

Figure 12:
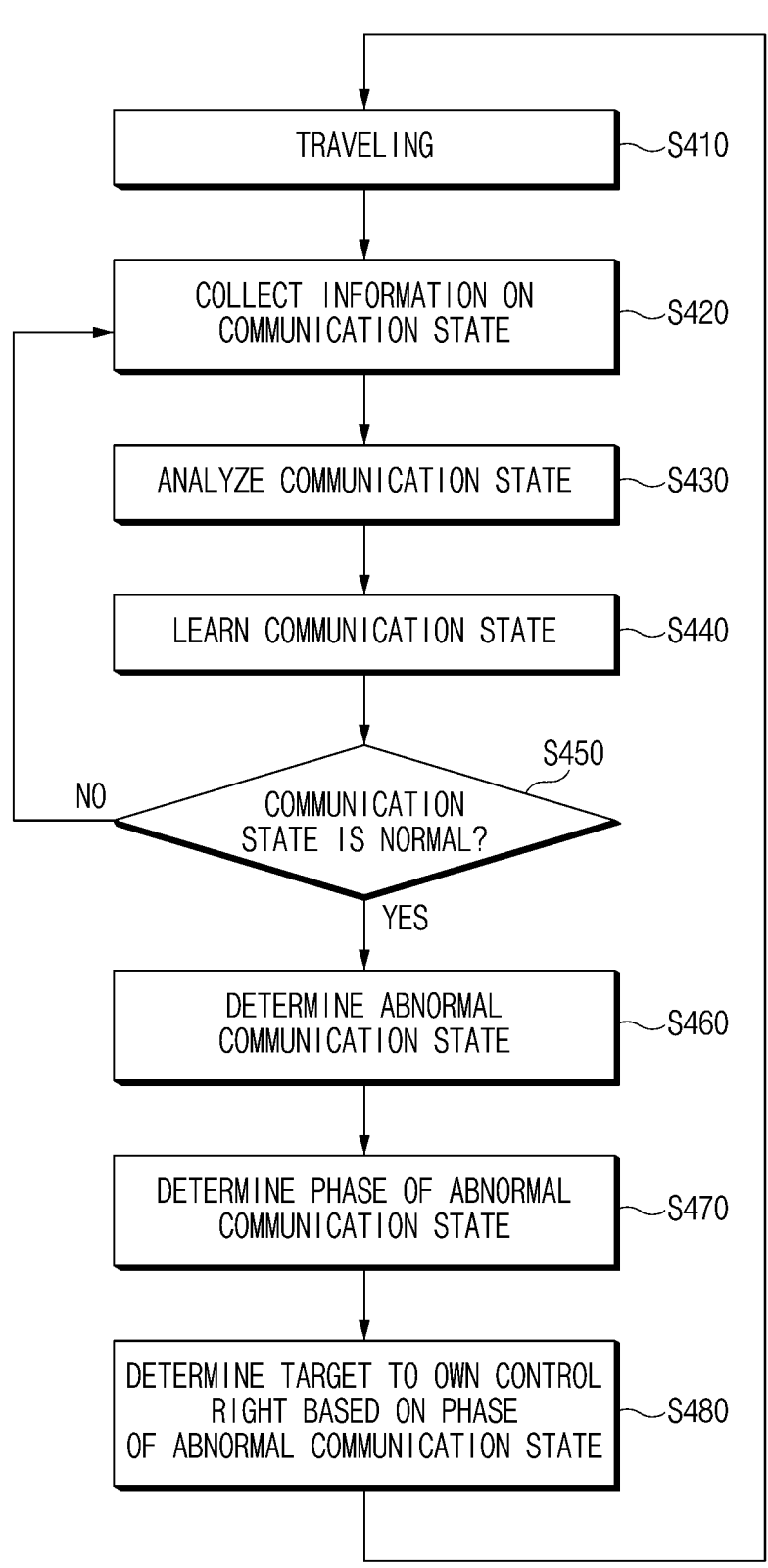
FIG. 12 is a flowchart illustrating a method for controlling a vehicle based on a communication state, according to an embodiment of the present disclosure.
Figure 13:
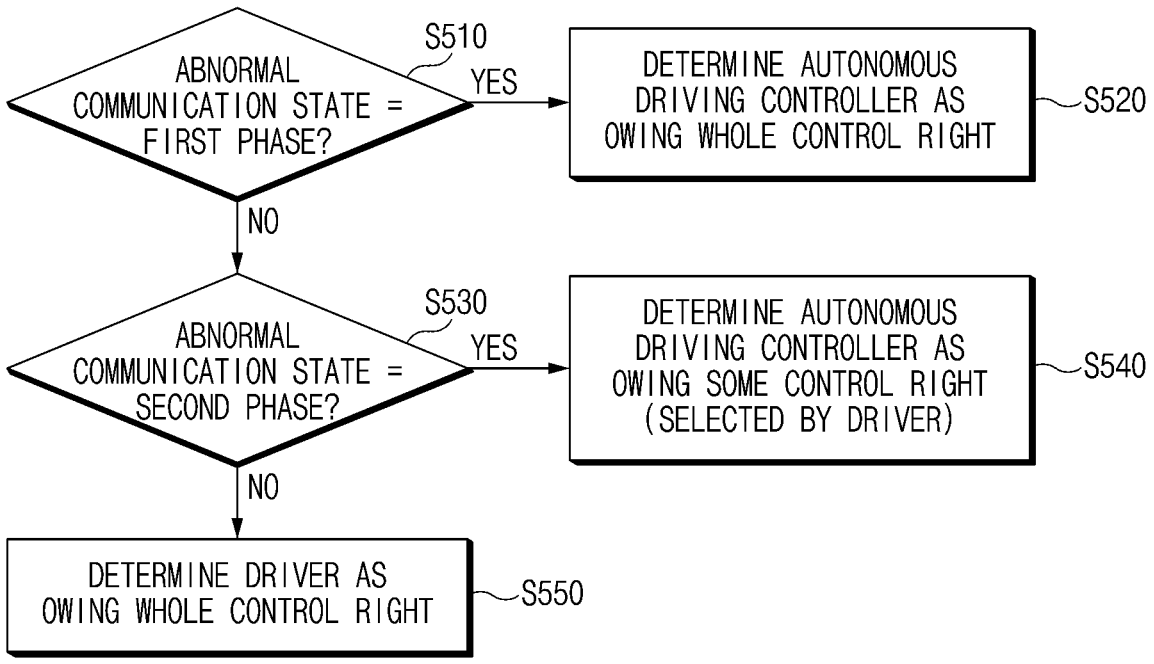
FIGS. 13 and 14 are flowcharts illustrating detailed operations of an operation for determining a target to own the control right of FIG. 12.
Figure 14:
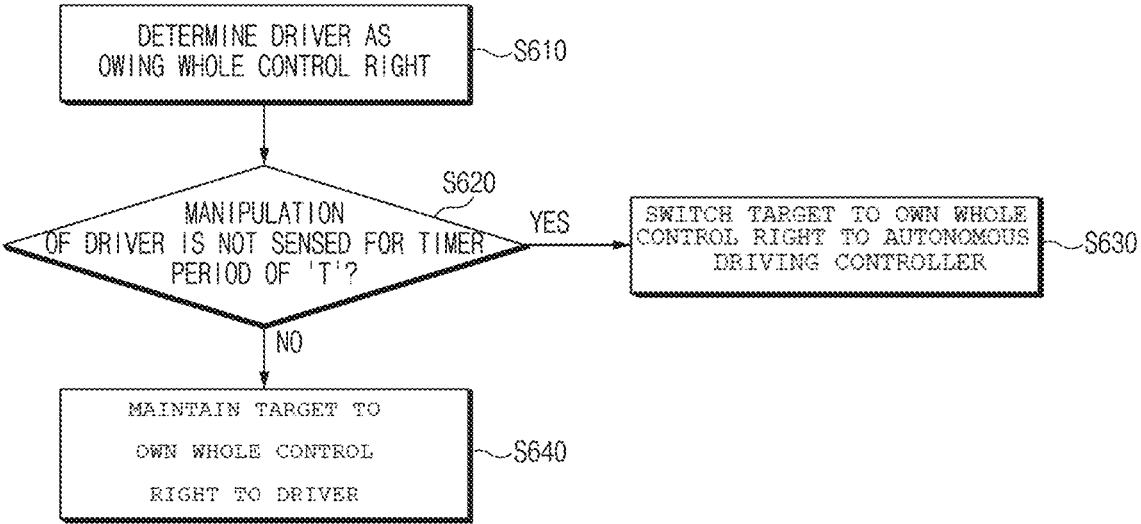

FIG. 12 is a view illustrating an operation flow of a method for controlling a vehicle, based on the abnormal communication state, according to an embodiment of the present disclosure, and FIGS. 13 and 14 are flowcharts illustrating a detailed operation flow of an operation to determine a target to own a control right of FIG. 12.

First, referring to FIG. 12, the vehicle control system collects information on a communication state of the controller (S420), during vehicle traveling (S410). In S420, the vehicle control system may collect information on a communication state through vehicle network communication between the first communication module 221 and controllers 21 to 29. In addition, the vehicle control system may collect the information on the communication state through V2X communication between the second communication module 223 and the surrounding roadside device 20 and/or the surrounding vehicle 30.

The vehicle control system analyzes the communication state of the vehicle, based on the information on the communication state, which is collected in S420 (S430), and learns the communication state of the vehicle, based on the communication state analysis result in S430 (S440). In S440, the vehicle control system may learn the communication state of the vehicle for each region, each terrain, and each attribute of communication data.

The vehicle control system determines whether the states of the communication by the first communication module 221 and the second communication module 223 are normal, based on a communication state analysis result in S430 and a communication state learning result in S440. When the states of the communication by the first communication module 221 and the second communication module 223 are not normal (S450), the vehicle control system iteratively performs S420 to S450 in real time or in a specific period.

Meanwhile, when it is determined that the states of the communication by the first communication module 221 and/or the second communication module 223 are normal in S450, the vehicle control system identifies the abnormal communication state by the first communication module 221 and/or the second communication module 223 (S460). The phase of the abnormal communication state, which is determined in S460, is identified (S470).

In this case, the vehicle control system determines the control right over the vehicle, that is, a target to own the control right over functions for supporting the autonomous driving of the vehicle, based on the abnormal communication state in the phase identified in S470 (S480)

Hereinafter, the flow of the detailed operation in S480 will be described with reference to embodiments of FIGS. 13 and 14.

Referring to FIG. 13, the vehicle control system determines, to the autonomous driving controller, the target to own the control right over the functions for supporting the autonomous driving of the vehicle to the autonomous driving controller (S520), when the abnormal communication state identified in S460 and S470 of FIG. 12 is the first phase (S510).

Referring to FIG. 13, the vehicle control system determines, to the autonomous driving controller, the target to own some control rights over the functions for supporting the autonomous driving of the vehicle to the autonomous driving controller (S540), when the abnormal communication state identified in S460 and S470 of FIG. 12 is the second phase (S530). In this case, the vehicle control system may provide, to the autonomous driving controller, the target to own a control right over a function, which is defined to correspond to the abnormal communication state in the second phase in advance, the functions for supporting the autonomous driving of the vehicle. In addition, the vehicle control system may determine, to the autonomous driving controller, the target to own a control right over some functions selected by the driver.

Meanwhile, the vehicle control system determines, to the driver, the target to own the whole control right over the functions for supporting the autonomous driving of the vehicle to the autonomous driving controller (S550), when the abnormal communication state identified in S460 and S470 of FIG. 12 is not in the second phase.

In this case, as illustrated in FIG. 14, the vehicle control system may switch, to the autonomous driving controller, the target to own the whole control right provided to the driver to prevent an accident from being caused, as the driver does not drive (S630), when the target to own the whole control right over the functions for supporting the autonomous driving of the vehicle is determined to the driver (S610) and then the driving of the driver is not sensed for the time period of 't' (S620).

Meanwhile, when the driving of the driver is identified as being sensed for the time period of 't' in S620, the vehicle control system maintains, to the driver, the target to own the control right determined in S610 (S640).

As described above, when the control right over each function for supporting the autonomous driving of the vehicle is provided depending on the abnormal state of the controller, the driving state of the vehicle is maintained under the control of the target (that is, the autonomous driving controller and/or the driver) having each control right.

In instances in which communication conditions are abnormal or communication performance is deteriorated, as the in-vehicle controllers and the communication module are aged or failed, dangerous situations may occur because information necessary for autonomous driving may not be rapidly obtained, the present disclosure may reflect the aging situation, the abnormal state, or deteriorated communication performance of the controller in controlling the autonomous driving. This is in contrast to conventional systems which merely warn the driver.

The present disclosure provides a system and a method for controlling a vehicle, based on the state of a controller, capable of preventing an accident from occurring in advance due to the abnormality of a controller during autonomous driving, by switching a control right over the functions for supporting the autonomous driving of the vehicle, depending on the abnormal state of the controller, when the controller is in the abnormal state during the driving of the vehicle.

The present disclosure also provides a system and a method for controlling a vehicle, based on a communication state, capable of preventing an accident from occurring in advance due to the abnormality in communication during autonomous driving, by determining a target to own a control right over the functions for supporting the autonomous driving of the vehicle, depending on phases of an abnormal communication state, when the abnormal communication state occurs.

In accordance with the present disclosure, accidents may be prevented from occurring in advance due to the abnormality of a controller during autonomous driving, by switching the control right over the functions for supporting the autonomous driving of the vehicle, depending on phases of the abnormal state of the controller, when the controller is in the abnormal state during the driving of the vehicle.

In accordance with the present disclosure, accidents may be prevented from occurring in advance due to the abnormality in communication during the autonomous driving, by determining a target to own the control right over the functions for supporting the autonomous driving of the vehicle, depending on phases of the abnormal communication state, when the abnormal communication state occurs.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

The term "module" used in this specification may include a unit implemented as hardware, software or firmware, and may be interchangeably used with a term, such as logic, a logical block, a unit, or a circuit. The module may be an integrated part, or a minimum unit of the part or a part thereof, which performs one or more functions. For example, according to an embodiment, the module may be implemented in the form of an application-specific integrated circuit (ASIC).

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A system for vehicle control, the system comprising:
a memory configured to store one or more instructions; and
one or more processors configured to execute the one or more instructions to:
analyze a state of each controller of one or more controllers inside a vehicle based on information collected from the one or more controllers inside the vehicle,
learn the state of the each controller, based on a state analysis result obtained by analyzing the state of the each controller, and
determine an abnormal state for at least one of the one or more controllers, based on the state analysis result for the each controller and a learning result obtained by learning the state of the each controller; and a vehicle controller configured to reassign vehicle control rights, based on the abnormal state for the at least one of the one or more controllers, wherein, when determining the abnormal state for the at least one of the one or more controllers, the one or more processors are further configured to determine an abnormal state phase resulting from the abnormal state of the at least one of the one or more controllers, and the abnormal state phase includes a first phase, a second phase and a third phase, each defined by different abnormal state conditions, and the vehicle control rights are reassigned based on the determined abnormal state phase.

2. The system of claim 1, wherein the one or more processors are further configured to analyze at least one of an aging state, a fault state, response performance, a control amount, and a sensor state of the each controller, based on the information collected from the one or more controllers.

3. The system of claim 1, wherein the one or more processors are further configured to:

learn response performance of the each controller, based on the state analysis result of the each controller, select a control parameter for determining performance of the each controller, based on the state analysis result of the each controller, and learn a parameter value input from the each controller, based on the selected control parameter.

4. The system of claim 1, wherein the vehicle controller is further configured to provide, to one of an autonomous driving controller and a manual driving control configured for operation by a driver, one or more control rights over functions for supporting autonomous driving of the vehicle, based on the abnormal state phase resulting from the abnormal state of the at least one of the one or more controllers, wherein the assignment of control rights differs depending on whether the abnormal state phase is the first phase, the second phase, or the third phase.

5. The system of claim 4, wherein the vehicle controller is further configured to provide, to the autonomous driving controller, all of the one or more control rights over the functions for supporting the autonomous driving of the vehicle, when the determined abnormal state phase of the at least one of the one or more controllers is a first phase.

6. The system of claim 4, wherein, when the determined abnormal state phase of the at least one of the one or more controllers is a second phase, the vehicle controller is further configured to:

provide to the autonomous driving controller, control rights over some of the functions for supporting the autonomous driving of the vehicle; and query the driver, via the manual driving control, regarding control rights over a remaining portion of the functions for supporting the autonomous driving of the vehicle, and provide the control rights over the remaining portion of the functions to the autonomous driving controller or the manual driving control, depending on selection of the driver in response to the query.

7. The system of claim 4, wherein the vehicle controller is further configured to provide, to the manual driving control, all of the one or more control rights over the functions for supporting the autonomous driving of the vehicle, when the determined abnormal state phase of the at least one of the one or more controllers is a third phase.

8. The system of claim 7, wherein the vehicle controller is further configured to switch all of the one or more control rights provided to the manual driving control to the autonomous driving controller, when manipulation of the manual driving control by the driver is not sensed for a specific time period.

9. A system for vehicle control, based on a communication state, the system comprising:

a first transceiver configured to communicate with one or more controllers inside a vehicle;

a second transceiver configured to communicate with at least one of a roadside device and a surrounding vehicle around the vehicle; and a vehicle controller configured to analyze and learn a state of communication by the first transceiver and the second transceiver, determine an abnormal communication state of the vehicle, and determine a target to own a vehicle control right depending on the abnormal communication state of the vehicle, wherein the vehicle controller is further configured to classify the abnormal communication state into a first communication phase, a second communication phase, and a third communication phase, and to reassign the target to own the vehicle control right based on the classified communication phase.

10. The system of claim 9, wherein the vehicle controller includes:

a memory configured to store one or more instructions; and one or more processors configured to execute the one or more instructions to:

analyze the state of the communication by the first transceiver and the second transceiver;

learn the state of the communication by the first transceiver and the second transceiver, based on a result obtained by analyzing the state of the communication; and determine an abnormal communication state of the vehicle, based on the result, which is obtained by analyzing the state of the communication by the first transceiver and the second transceiver, and a result obtained by learning the state of the communication by the first transceiver and the second transceiver.

11. The system of claim 10, wherein the one or more processors are further configured to analyze consistency of a communication speed, a communication connection state, and communication data, based on the communication data between the first transceiver and the one or more controllers, analyze consistency and suitability of the communication speed, the communication connection state, and the communication data, based on vehicle to infrastructure (V2I) communication data between the second transceiver and the roadside device, and analyze consistency and suitability of the communication speed, the communication connection state, and the communication data, based on vehicle to vehicle (V2V) communication data between the second transceiver and the surrounding vehicle.

12. The system of claim 10, wherein the one or more processors are further configured to learn a communication speed and the communication state for each region, each terrain, and each attribute of communication data, with respect to the first transceiver, the second transceiver, and the one or more controllers.

13. The system of claim 10, wherein the one or more processors are further configured to determine an abnormal communication state of at least one of the first transceiver and the one or more controllers, based on consistency of a communication speed, a communication connection state, and communication data between the first transceiver and the one or more controllers, and determine an abnormal communication state of the second transceiver, based on consistency and suitability of a communication speed, a communication connection state, and communication data among the second transceiver, the roadside device, and the surrounding vehicle, wherein each determined abnormal communication state is further classified into one of a first communication phase, a second communication phase, and a third communication phase.

14. The system of claim 10, wherein the one or more processors are further configured to determine a phase of an abnormal communication state among at least one of the first transceiver, the second transceiver, and the one or more controllers, when the abnormal communication state is determined.

15. The system of claim 14, wherein the vehicle controller is further configured to determine, to an autonomous driving controller or a manual driving control configured for operation by a driver, a target to own one or more control rights over functions for supporting autonomous driving of the vehicle, based on the phase of the abnormal communication state.

16. The system of claim 15, wherein the vehicle controller is further configured to determine, to the autonomous driving controller, a target to own all of the one or more control rights over the functions for supporting the autonomous driving of the vehicle, when the abnormal communication state is in a first phase.

17. The system of claim 15, wherein the vehicle controller is further configured to determine, to the autonomous driving controller, the target to own some of the one or more control rights over the functions for supporting the autonomous driving of the vehicle, provide at least one of querying, via the manual driving control, the driver for a control right over the functions for supporting the autonomous driving of the vehicle, and determine a target to own the control right, depending on selection of the driver for the query, when the determined abnormal communication state phase of the one or more controllers is a second phase.

18. The system of claim 15, wherein the vehicle controller is further configured to determine, to the manual driving control, a target to own all of the one or more control rights over the functions for supporting the autonomous driving of the vehicle, when the abnormal communication state is in a third phase.

19. The system of claim 18, wherein the vehicle controller is further configured to switch a target to own all of the one or more control rights provided to the manual driving control to the autonomous driving controller, when manipulation of the manual driving control by the driver is not sensed for a specific time period.

* * * * *